United States Patent
Yoda et al.

(10) Patent No.: US 12,272,811 B2
(45) Date of Patent: Apr. 8, 2025

(54) METHOD OF MANUFACTURING BATTERY ELECTRODE

(71) Applicant: NISSAN MOTOR CO., LTD., Yokohama (JP)

(72) Inventors: Kazuyuki Yoda, Kanagawa (JP); Tomohiro Kaburagi, Kanagawa (JP); Hiroshi Kubota, Kanagawa (JP); Shinichi Akaishi, Kanagawa (JP); Hideaki Horie, Kanagawa (JP); Yuki Kusachi, Kanagawa (JP); Yuichiro Yokoyama, Kyoto (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 768 days.

(21) Appl. No.: 17/427,161

(22) PCT Filed: Jan. 29, 2020

(86) PCT No.: PCT/JP2020/003205
§ 371 (c)(1),
(2) Date: Jul. 30, 2021

(87) PCT Pub. No.: WO2020/162285
PCT Pub. Date: Aug. 13, 2020

(65) Prior Publication Data
US 2022/0123274 A1 Apr. 21, 2022

(30) Foreign Application Priority Data
Feb. 7, 2019 (JP) .................................. 2019-020693

(51) Int. Cl.
*H01M 4/04* (2006.01)
(52) U.S. Cl.
CPC ................................. *H01M 4/0404* (2013.01)
(58) Field of Classification Search
CPC .................................................. H01M 4/0404
See application file for complete search history.

(56) References Cited

U.S. PATENT DOCUMENTS

| | | | | |
|---|---|---|---|---|
| 3,598,566 A | * | 8/1971 | Inoue | B22F 1/14 419/30 |
| 2009/0325057 A1 | | 12/2009 | Kim et al. | |
| 2011/0223359 A1 | * | 9/2011 | Yang | H01M 4/5825 977/932 |
| 2017/0256781 A1 | | 9/2017 | Suzuki et al. | |

FOREIGN PATENT DOCUMENTS

| | | | |
|---|---|---|---|
| CN | 103199242 B | 5/2017 | |
| JP | 03-294405 A | 12/1991 | |
| JP | 2851681 B2 * | 1/1999 | ............. B22F 7/002 |
| JP | 2010062008 A * | 3/2010 | |
| JP | 2016-62654 A | 4/2016 | |
| WO | WO-2007/129839 A1 | 11/2007 | |
| WO | WO-2014/024571 A1 | 2/2014 | |
| WO | WO-2016038889 A1 * | 3/2016 | ........ H01M 10/0525 |

* cited by examiner

Primary Examiner — Tabatha L Penny
(74) Attorney, Agent, or Firm — Foley & Lardner LLP

(57) ABSTRACT

A method of manufacturing a battery electrode includes a powder supply step, a vibration step, a sorting step, a moving step, and a deposition step, in the powder supply step, a powder 60 composed of granulated particles is supplied, in the vibration step, vibration is applied to the powder, in the sorting step, the powder is caused to pass through at least one opening H1, H2 to adjust a particle diameter of the granulated particles to a particle diameter that allows passing through the opening, in the moving step, the powder that has passed through the opening is moved from an outlet position P1 of the opening to a supply position P2 where the powder is supplied to the surface of a current collector 31, and in the deposition step, the powder is deposited on the surface of the current collector. With the method of manufacturing a battery electrode, it is possible to provide a battery electrode that can improve battery performance by making a thickness and a density of the powder composed of granulated particles supplied onto the current collector uniform.

17 Claims, 5 Drawing Sheets

METHOD OF MANUFACTURING BATTERY ELECTRODE

TECHNICAL FIELD

The present invention relates to a method of manufacturing a battery electrode.

BACKGROUND ART

In recent years, the spread of various electric vehicles has been expected in order to solve environmental and energy problems. Secondary batteries are being enthusiastically developed as in-vehicle power supplies such as motor drive power supplies that hold the key to the spread of these electric vehicles.

For example, a method of manufacturing an electrode using a powder made of an electrode material has been known as a method of manufacturing a battery electrode. For example, Patent Literature 1 below discloses a method of manufacturing a battery electrode in which granulated particles containing an electrode active material and a conductive aid are used as the electrode material, and a powder composed of the granulated particles is supplied onto a current collector and deposited.

CITATION LIST

Patent Literatures

Patent Literature 1: JP 2016-062654 A

SUMMARY OF INVENTION

Technical Problem

According to the study by the present inventors, it has been found that in the method of manufacturing a battery electrode as disclosed in Patent Literature 1, the thickness of a powder that is composed of granulated particles and supplied to the surface of a current collector is uneven, and the density of the powder is a distributed. This may significantly reduce battery performance. It is conceivable that the main cause of the above problem is that, for example, an aggregate with an increased particle diameter due to the aggregation of a plurality of powders composed of granulated particles, or the powder composed of granulated particles with a large particle diameter is supplied onto the current collector, and the amount of supply of the granulated particles is uneven.

Therefore, the present invention has been made in view of the above circumstances, and an object of the present invention is to provide a method of manufacturing a battery electrode, the method being capable of improving battery performance by making the thickness and density of a powder that is composed of granulated particles and is supplied to the surface of a current collector uniform.

Solution to Problem

The present inventors have made diligent studies to solve the above problems. As a result, it has been found effective that when a powder composed of granulated particles is supplied to the surface of a current collector, the powder is moved a predetermined distance, and then supplied, and the present invention has been completed.

That is, a manufacturing method according to the present invention includes a powder supply step of supplying a powder composed of granulated particles containing an electrode active material and a conductive aid and a deposition step of depositing the powder on a surface of a current collector. The manufacturing method includes, between the powder supply step and the deposition step, a vibration step, a sorting step, and a moving step. In the vibration step, vibration is applied to the powder. In the sorting step, the powder is caused to pass through at least one opening to adjust a particle diameter of the granulated particles to a particle diameter that allows passing through the opening. In the moving step, the powder that has passed through the opening is moved from an outlet position of the opening to a supply position where the powder is supplied to the surface of the current collector.

DESCRIPTION OF EMBODIMENTS

Figure 1:
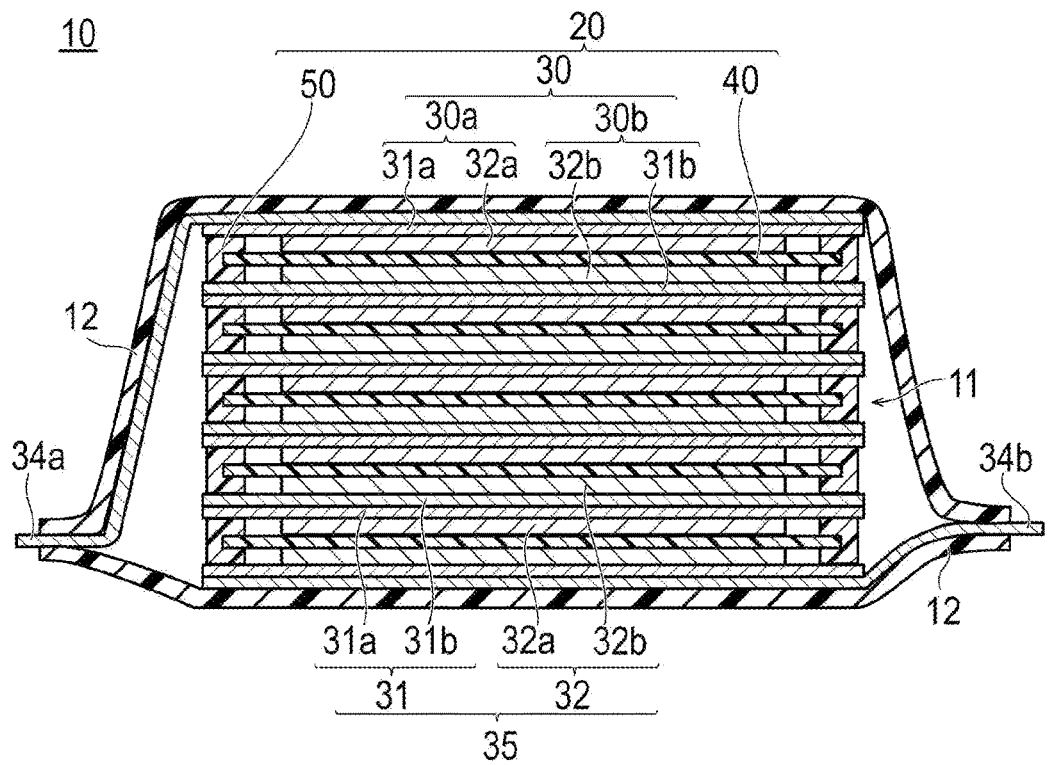
FIG. 1 is a cross-sectional view illustrating an outline of the overall structure of a battery according to an embodiment of the present invention.

One embodiment of the present invention is a method of manufacturing an electrode, the method including a powder supply step of supplying a powder composed of granulated particles containing an electrode active material and a conductive aid (hereinafter, also simply referred to as "powder") and a deposition step of depositing the powder on a surface of a current collector. The manufacturing method includes, between the powder supply step and the deposition step, a vibration step, a sorting step, and a moving step. In the vibration step, vibration is applied to the powder. In the sorting step, by passing the powder through at least one opening, the particle diameter of the granulated particles is adjusted to a particle diameter that allows passing through the opening. In the moving step, the powder that has passed through the opening is moved from an outlet position of the opening to a supply position where the powder is supplied to the surface of the current collector. In the deposition step, the powder is deposited on the surface of the current collector that moves relative to the supply position. According to the manufacturing method of the present embodiment, it is possible to supply a fixed amount of the powder to the surface of the current collector while an aggregate is crushed to make the particle diameter of the granulated particles uniform. As a result, the thickness and density of the powder supplied to the surface of the current collector can be made uniform, so that the battery performance can be improved.

The detailed mechanism that achieves the effects described above is unknown, but it is assumed as follows. The technical scope of the present invention is not limited to the following mechanism.

The powder supplied in the supply step may include aggregates with an increased particle diameter due to the aggregation of a plurality of granulated particles. If the aggregates are supplied to the surface of the current collector, the thickness of the powder may be uneven or the density may be distributed. For example, it is conceivable to eliminate aggregates and granulated particles with a large particle diameter by sifting the powder onto the surface of the current collector through the mesh of a sieve. However, if the powder includes aggregates, the distribution of the particle diameter of the granulated particles stored in the sieve becomes large. As a result, only the powder with a small particle diameter is sifted through the mesh of the sieve, and thus there is a variation in the amount of the powder sifted onto the surface of the current collector through the mesh. In addition, there is also a variation in the timing when the powder is sifted through mesh. As a result, the thickness of the powder on the surface of the current collector may be uneven, or the density may be distributed, which may significantly reduce the battery performance.

In the present embodiment, by applying vibration to the aggregate in the vibration step, the aggregate can be crushed and separated into a single granulated particle. Further, in the sorting step, the granulated particles and aggregates with a particle diameter larger than that of the opening can be eliminated, and granulated particles with a more uniform particle diameter can be sorted. Furthermore, in the moving step, a plurality of the powders that have passed through the opening move a predetermined distance from the outlet position to the supply position to be aligned at the supply position. Consequently, a fixed amount of a plurality of powders aligned at the supply position can be supplied to the surface of the current collector that moves relative to the supply position. As a result, it is conceivable that the thickness and density of the powder supplied to the surface of the current collector can be made uniform.

Hereinafter, embodiments of the present invention will be described with reference to the drawings, but the technical scope of the present invention shall be defined by the description of the claims and is not limited to the following embodiments. In the following, for the sake of convenience, the battery obtained by the manufacturing method according to the present invention will be described, and then the method of manufacturing a battery electrode according to the present invention will be described in detail. The dimensional ratio in the drawings is exaggerated for the sake of convenience of explanation, and may be different from the actual ratio. In the present specification, "X to Y" that indicates a range means "X or more and Y or less". Moreover, unless otherwise specified, operations and measurements of physical properties and the like are performed under the conditions of a room temperature of 20 to 25° C. and a relative humidity of 40 to 50%.

<Battery>

A bipolar lithium ion secondary battery, which is a type of non-aqueous electrolyte secondary battery, will be described as an example of the battery according to the embodiment of the present invention, but the battery to which the present invention is applied is not limited to the bipolar lithium ion secondary battery. Here, the bipolar lithium ion secondary battery is a secondary battery that includes a bipolar electrode, and is charged and discharged by lithium ions moving between a positive electrode and a negative electrode. For example, the present invention can also be applied to any conventionally known secondary battery such as a so-called parallel laminate type battery in which a power generating element is composed of electrodes that are connected in parallel. In the following description, the bipolar lithium ion secondary battery is simply referred to as "battery".

FIG. 1 is a cross-sectional view schematically illustrating a battery 10 according to an embodiment of the present invention. As illustrated in FIG. 1, in order to prevent external impact and environmental deterioration, the battery 10 preferably has a structure in which a power generating element where the charge and discharge reaction actually proceeds is sealed inside an outer casing body 12.

As illustrated in FIG. 1, the power generating element of the battery 10 of the present embodiment is a stack 11 in which a plurality of unit cells 20 are stacked. Hereinafter, the power generating element is also referred to as "stack 11". The number of times the unit cell 20 is stacked is preferably adjusted according to a desired voltage.

As illustrated in FIG. 1, a positive electrode 30a and a negative electrode 30b constitute a bipolar electrode 35 in which a positive electrode active material layer 32a, which is electrically coupled, is formed on one surface of the current collector 31, and a negative electrode active material layer 32b, which is electrically coupled, is formed on the opposite surface of the current collector 31.

Although the current collector 31 is illustrated in FIG. 1 as having a stacked structure (two-layer structure) in which a positive electrode current collector 31a and a negative electrode current collector 31b are combined, the current collector 31 may have a single-layer structure composed of a single material.

Further, in the battery 10 illustrated in FIG. 1, a positive electrode current collecting plate (a positive electrode tab) 34a is arranged so as to be adjacent to the positive electrode current collector 31a on a positive electrode side, and the positive electrode current collecting plate 34a is extended and led from the outer casing body 12. On the other hand, a negative electrode current collecting plate (a negative electrode tab) 34b is arranged so as to be adjacent to the negative electrode current collector 31b on a negative electrode side, and the negative electrode current collecting plate 34b is also extended and led from the outer casing body 12.

[Current Collector]

The current collector 31 (the positive electrode current collector 31a and the negative electrode current collector 31b adjacent to each other) has a function of mediating the movement of electrons from one surface in contact with the positive electrode active material layer 32a to the other surface in contact with the negative electrode active material layer 32b. The material constituting the current collector 31 is not particularly limited, and for example, a conductive resin or a metal can be used.

From the viewpoint of reducing the weight of the current collector 31, the current collector 31 is preferably a resin current collector made of a conductive resin. From the viewpoint of blocking the movement of lithium ions between the unit cells 20, a metal layer may be provided in a part of the resin current collector.

Specifically, examples of the conductive resin that is a constituent material of the resin current collector include a resin obtained by adding a conductive filler to a conductive polymer material or a non-conductive polymer material as necessary. Examples of the conductive polymer material include polyaniline, polypyrrole, polythiophene, polyacetylene, polyparaphenylene, polyphenylene vinylene, polyoxadiazole, and the like. Since these conductive polymer materials have sufficient conductivity without adding the conductive filler, these materials are advantageous in terms of simplifying a manufacturing process or reducing the weight of the current collector.

Examples of the non-conductive polymer material include polyethylene (PE; such as high density polyethylene (HDPE) and low density polyethylene (LDPE)), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS), and the like. These non-conductive polymer materials can have excellent potential resistance or solvent resistance.

The conductive filler can be used without particular limitation as long as the conductive filler is a conductive substance. For example, materials having excellent conductivity, potential resistance, or lithium ion blocking property include metals, conductive carbons, and the like. The metal is not particularly limited, but preferably includes at least one metal selected from the group consisting of nickel, titanium, aluminum, copper, platinum, iron, chromium, tin, zinc, indium, antimony, and potassium, or an alloy or a metal oxide containing these metals. Further, the conductive carbon is not particularly limited. The conductive carbon preferably includes at least one selected from the group consisting of acetylene black, vulcan (registered trademark), black pearl (registered trademark), carbon nanofiber, Ketjen black (registered trademark), carbon nanotube (CNT), carbon nanohorn, carbon nanoballoon, and fullerene.

The amount of the conductive filler added is not particularly limited as long as sufficient conductivity can be imparted to the current collector 31, preferably about 5 to 35% by mass, more preferably 10 to 30% by mass, still more preferably 15 to 20% by mass.

When the current collector 31 is made of a metal, examples of the metal include aluminum, nickel, iron, stainless steel, titanium, copper, and the like. In addition to these metals, a clad material of nickel and aluminum, a clad material of copper and aluminum, a plating material of these metals, or the like can be preferably used. A foil obtained by coating a metal surface with aluminum can also be used. In particular, aluminum, stainless steel, copper, and nickel are preferable from the viewpoints of electron conductivity, a battery operating potential, adhesion of a negative electrode active material to the current collector 31 by sputtering, and the like.

[Electrode Active Material Layer (Positive Electrode Active Material Layer, Negative Electrode Active Material Layer)]

An electrode active material layer (the positive electrode active material layer 32a and the negative electrode active material layer 32b) 32 includes electrode granulated particles containing an electrode active material (a positive electrode active material or a negative electrode active material) and a conductive aid. The electrode granulated particles may further contain an electrolyte solution and/or a pressure-sensitive adhesive, as necessary. Furthermore, the electrode active material layer 32 may contain an ion conductive polymer or the like, as necessary.

(Electrode Granulated Particles)

The electrode granulated particles (also simply referred to as "granulated particles") according to the present invention are a powder essentially containing an electrode active material and a conductive aid, and may further contain a liquid component (preferably an electrolyte solution) and a pressure-sensitive adhesive.

In the present specification, "powder" is defined as an aggregation of granulated particles in which the components present in the system exhibit substantially solid properties, and the aggregation is defined as including at least one of a single granulated particle and an aggregate in which a plurality of granulated particles are aggregated. For example, when the system is in a solution state or a slurry state because of a relatively large amount of liquid components, the term "powder" cannot be used. As long as this definition is satisfied, the powder may contain a liquid component such as an electrolyte solution. From the viewpoint of separating the aggregated granulated particles and uniformly distributing the granulated particles on the surface of the current collector, the powder is preferably a dry powder that does not contain a liquid component.

On the other hand, from the viewpoint of easily adjusting a particle diameter, the powder composed of granulated particles is preferably a wet powder containing a liquid component such as an electrolyte solution (preferably an electrolyte solution). The content of the liquid component in this case is not particularly limited as long as the "powder" state is maintained, but is preferably 0 to 10% by mass, more preferably 0.01 to 8% by mass, still more preferably 0.1 to 5% by mass, and particularly preferably 0.1 to 3% by mass with respect to 100% by mass of the powder composed of granulated particles. In correspondence with this, the amount of a solid content in the powder composed of electrode granulated particles is preferably 90 to 100% by mass, more preferably 92 to 99.99% by mass, still more preferably 95 to 99.9% by mass, and particularly preferably 97 to 99.9% by mass with respect to 100% by mass of the powder composed of granulated particles. If the content of the liquid component of the powder composed of granulated particles is too large, the adhesiveness of the surface of the granulated particles increases, and thus it is difficult to separate the powders composed of granulated particles. If the liquid component is contained within the ranges described above, by combining the conditions of a supply step and the like, the powder composed of granulated particles can be arranged on the surface of the current collector so that the thickness and density are uniform.

A volume average particle diameter D50 (also simply referred to as "D50") of the granulated particles according to the present embodiment is 310 μm or less. D50 is preferably 300 μm or less, more preferably 280 μm or less, still more preferably 240 μm or less, still further preferably 200 μm or less, and particularly preferably 180 μm or less. If the particle diameter of the granulated particles is too large, the gap between the particles is large, which may cause an increase in the resistance value. Further, although the lower limit of D50 is not particularly limited, if the particle diameter of the granulated particles is too small, the fluidity is degraded and it is difficult to form an electrode in preparing the electrode. From the viewpoints described above, the particle diameter of the granulated particles is preferably 43 µm or more, more preferably 45 µm or more, still more preferably 50 µm or more, and particularly preferably 100 µm or more.

The method of measuring D50 is not particularly limited, but for example, a method of performing classification with a multi-stage sieve and calculating D50 from the distribution of the weight ratio of each particle group can be used. Specifically, a predetermined amount of the powder composed of granulated particles is charged in a sieve and sonic vibration is applied to the sieve to classify the granulated particles. In this case, classification is performed using a plurality of sieve nets with different meshes, the weight of the sieve is measured before and after the classification, and the particle size distribution of the powder charged is calculated. D50 is calculated from this particle size distribution.

(Positive Electrode Active Material)

Examples of the positive electrode active material include lithium-transition metal composite oxides such as $LiMn_2O_4$, $LiCoO_2$, $LiNiO_2$, $Li(Ni\text{—}Mn\text{—}Co)O_2$ and those in which some of these transition metals are substituted with other elements, lithium-transition metal phosphate compounds, lithium-transition metal sulfate compounds, and the like. In some cases, two or more types of positive electrode active materials may be used in combination. Preferably, a lithium-transition metal composite oxide is used as the positive electrode active material from the viewpoints of capacity and output characteristics. More preferably, a composite oxide containing lithium and nickel is used. Still more preferably, $Li(Ni\text{—}Mn\text{—}Co)O_2$ and those in which some of these transition metals are substituted with other elements (hereinafter, also simply referred to as "NMC composite oxides"), lithium-nickel-cobalt-aluminum composite oxides (hereinafter, also simply referred to as "NCA composite oxides"), or the like are used. The NMC composite oxide has a layered crystal structure in which a lithium atom layer and a transition metal (Mn, Ni and Co are arranged in order) atom layer are alternately stacked via an oxygen atom layer. Further, the NMC complex oxide contains one Li atom per atom of transition metal, and thus the amount of Li that can be taken out is twice that of a spinel type lithium manganese oxide, that is, the supply capability is doubled and high capacity can be achieved.

(Negative Electrode Active Material)

Examples of the negative electrode active material include carbon materials such as graphite (graphite), soft carbon, and hard carbon, lithium-transition metal composite oxides (for example, $Li_4Ti_5O_{12}$), metal materials (tin, silicon), lithium alloy-based negative electrode materials (for example, lithium-tin alloy, lithium-silicon alloy, lithium-aluminum alloy, lithium-aluminum-manganese alloy, and the like), and the like. In some cases, two or more types of negative electrode active materials may be used in combination. Preferably, a carbon material, a lithium-transition metal composite oxide, and a lithium alloy-based negative electrode material are preferably used as the negative electrode active material from the viewpoints of capacity and output characteristics. It is needless to mention that a negative electrode active material other than the materials described above may be used. Further, a coating resin such as a (meth)acrylate-based copolymer has a property of being particularly easy to adhere to a carbon material. For this reason, from the viewpoint of providing a structurally stable electrode material, it is preferable to use a carbon material as the negative electrode active material.

(Conductive Aid)

The conductive aid forms an electron conduction path and reduces the electron transfer resistance of the electrode active material layer 32, thus being capable of contributing to the improvement of the high-rate output characteristics of a battery.

Examples of the conductive aid include, but are not limited to, metals such as aluminum, stainless steel, silver, gold, copper, and titanium, alloys or metal oxides containing these metals; carbon fibers (specifically, vapor-grown carbon fibers (VGCF) and the like), and carbon such as carbon nanotubes (CNT), carbon nanofibers, carbon black (specifically, acetylene black, Ketjen black (registered trademark), furnace black, channel black, thermal lamp black, and the like). Further, a particulate ceramic material or a resin material coated with the metal material described above by plating or the like can also be used as the conductive aid. Among these conductive aids, from the viewpoint of electrical stability, the conductive aid preferably includes at least one selected from the group consisting of aluminum, stainless steel, silver, gold, copper, titanium, and carbon, more preferably includes at least one selected from the group consisting of aluminum, stainless, silver, gold, and carbon, and still more preferably includes at least one selected from the group consisting of carbon. Only one of these conductive aids may be used alone, or two or more thereof may be used in combination.

The shape of the conductive aid is preferably particulate or fibrous. When the conductive aid is particulate, the shape of particles is not particularly limited, and may be any shape such as powder, sphere, rod, needle, plate, column, indefinite shape, scale, and spindle. When the conductive aid is particulate, the average particle diameter (the primary particle size) is preferably 100 nm or less, more preferably 60 nm or less, and still more preferably 40 nm or less. When the conductive aid is fibrous, the aspect ratio is preferably 300 or less, more preferably 150 or less, and still more preferably 90 or less. When the conductive aid is fibrous, the average fiber diameter is preferably 500 nm or less, more preferably 300 nm or less, and still more preferably 150 nm or less. When the conductive aid is fibrous, the average fiber length is preferably 50 µm or less, more preferably 20 µm or less, and still more preferably 10 µm or less.

The "particle diameter" of the conductive aid means the maximum distance among the distances between any two points on the contour of the conductive aid. As the value of "average particle diameter", values calculated as the average of the particle diameter of particles observed in several to several tens of fields of view with an observation unit such as a scanning electron microscope (SEM) or a transmission electron microscope (TEM) can be adopted. The fiber diameter and fiber length of the fibrous conductive aid can be the average of several to several tens of fiber diameters actually measured with a transmission electron microscope (TEM), a scanning electron microscope (SEM), or the like.

The content of the conductive aid in electrode granulated particles is not particularly limited, but it is preferable to contain 0.01 to 10% by mass, more preferable to contain 0.1 to 8% by mass, and still more preferable to contain 1 to 6% by mass of the conductive aid, with respect to the total mass of the solid content of the electrode granulated particles. With these ranges, the conductive aid can successfully form an electron conduction path in the electrode active material layer 32.

(Electrolyte Solution)

The powder composed of granulated particles according to the present invention may further contain an electrolyte solution in order to adjust a particle diameter. As the content of the electrolyte solution increases, the particle diameter of the granulated particles tends to increase. The content of the electrolyte solution is not particularly limited as long as the "powder" state is maintained, but is preferably 0.01 to 10% by mass, more preferably 0.01 to 8% by mass, still more preferably 0.1 to 5% by mass, and particularly preferably 0.1 to 3% by mass with respect to 100% by mass of the powder composed of granulated particles.

The electrolyte solution (the liquid electrolyte) has a form in which a lithium salt is dissolved in a solvent. Examples of the solvent constituting the electrolyte solution of the present invention include carbonates such as ethylene carbonate (EC), propylene carbonate (PC), dimethyl carbonate (DMC), diethyl carbonate (DEC), and ethyl methyl carbonate. Examples of the lithium salt include lithium salts of inorganic acids such as $LiPF_6$, $LiBF_4$, $LiSbF_6$, $LiAsF_6$ $LiClO_4$, and $Li[(FSO_2)_2N](LiFSI)$, and lithium salts of organic acids such as $LiN(CF_3SO_2)_2$, $LiN(C_2F_5SO_2)_2$ and $LiC(CF_3SO_2)_3$. The concentration of the lithium salt in the electrolyte solution is preferably 0.1 to 3.0 M and more preferably 0.8 to 2.2 M. When the additive is used, the amount of the additive used is preferably 0.5 to 10% by mass and more preferably 0.5 to 5% by mass, with respect to 100% by mass of the electrolyte solution before the additive is added.

Examples of the additive include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylenecarbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methyleneethylene carbonate, 1,1-dimethyl-2-methylene ethylene carbonate. Among these additives, vinylene carbonate, methylvinylene carbonate, and vinylethylene carbonate are preferable, and vinylene carbonate and vinylethylene carbonate are more preferable. Only one of these cyclic carbonates may be used alone, or two or more thereof may be used in combination.

(Pressure-Sensitive Adhesive)

The granulated particles according to the present invention may further contain a pressure-sensitive adhesive (a binder) as a solid content in order to adjust a particle diameter. As the content of the adhesive increases, the particle diameter of the granulated particles tends to increase.

Examples of the pressure-sensitive adhesive include (meth)acrylic acid ester pressure-sensitive adhesives such as the POLYTHICK (registered trademark) series. The content of the pressure-sensitive adhesive in the granulated particles is preferably 0.01 to 10% by mass, more preferably 0.01 to 8% by mass, still more preferably, 0.1 to 5% by mass, and particularly preferably 0.1 to 3% by mass with respect to the total mass of the solid content of the granulated particles.

(Ion Conductive Polymer)

Examples of the ion conductive polymer include known polyoxyalkylene oxide polymers such as polyethylene oxide (PEO) based polymers and polypropylene oxide (PPO) based polymers.

<Method of Manufacturing Electrode>

The present invention relates to a method of manufacturing an electrode. The electrode manufactured by using the present manufacturing method can be used as an electrode for a non-aqueous electrolyte secondary battery such as the bipolar battery according to the embodiment described above.

The method of manufacturing an electrode according to the present embodiment is a method of preparing an electrode using a powder composed of granulated particles, and essentially includes a supply step of supplying the powder composed of granulated particles to the surface of a current collector. When the electrode is prepared from an electrode active material slurry containing a liquid solvent, a drying step of binding a pressure-sensitive adhesive is required. The drying step can be omitted by preparing an electrode using the powder composed of granulated particles as in the present invention, so that the manufacturing cost can be significantly reduced.

Hereinafter, the method of manufacturing an electrode according to the present embodiment, which includes the features described above, will be described in detail. The method of manufacturing an electrode according to the present embodiment includes a granulation step, a supply step, and a pressing step.

[Granulation Step]

In the granulation step, powders containing an electrode active material and a conductive aid are mixed using a stirring device to produce granulated particles. The stirring device is not particularly limited as long as the stirring device can perform a process of mixing the powders containing the electrode active material and the conductive aid, and a known mixer that includes a container in which the powder is stored and a stirring blade that rotates relative to the container within the container can be used.

The granulation step can include a step of charging the electrode active material and the conductive aid into the container of the stirring device and stirring these materials to manufacture granulated particles (hereinafter, also referred to as "first granulated particles") (hereinafter, also referred to as "first granulation step"). Further, the granulation step can include a step of charging the electrode active material, the conductive aid, and a liquid component (preferably, an electrolyte solution) into the container of the stirring device and stirring these materials to manufacture granulated particles (hereinafter, also referred to as "second granulated particles") (hereinafter, also referred to as "second granulation step"). Furthermore, the granulation step can include a step of charging the electrode active material, the conductive aid, the liquid component (preferably, the electrolyte solution), and a pressure-sensitive adhesive into the container of the stirring device and stirring these materials to manufacture granulated particles (hereinafter, also referred to as "third granulated particles") (hereinafter, also referred to as "third granulation step"). The first granulation step, the second granulation step, and the third granulation step may be performed in sequence as a series of steps, or only one of the steps may be performed as a single granulation step of manufacturing different granulated particles (the first granulated particles, the second granulated particles, or the third granulated particles). In the following, each of the granulation steps will be briefly described.

(First Granulation Step)

In the first granulation step, the electrode active material and the conductive aid are charged into the container of the stirring device and stirred, so that the first granulated particles are manufactured. In the first granulation step, a dry mixing process is performed. The processing conditions of the mixing process are determined so that the electrode active material and the conductive aid are uniformly mixed, and have a particle diameter and fluidity that allow easy forming into an electrode.

Examples of the processing conditions of the mixing process include a stirring speed, a stirring time, a stirring temperature, and the like. The stirring speed is the peripheral speed of the stirring blade of the stirring device. Here, the "peripheral speed" is the speed of the stirring blade, which is a rotating body, at the outermost peripheral position (the maximum radius position), and it can be expressed as the peripheral speed of the stirring blade=2πnr, where the number of rotations per unit time is denoted by n and the maximum radius is denoted by r. The peripheral speed can be appropriately set to a value at which shear energy to granulate granulated particles without destroying the granulated particles can be generated, depending on the device conditions such as the size and shape of the container, and the shape, number and arrangement of the stirring blades in the stirring device. The peripheral speed is not particularly limited, but is preferably 1 to 100 m/s, more preferably 10 to 50 m/s, still more preferably 15 to 30 m/s, and particularly preferably 17 to 25 m/s. Further, as the peripheral speed increases, the particle diameter of the granulated particles tends to decrease. If the peripheral speed falls within the ranges described above, by combining with conditions such as the content of the pressure-sensitive adhesive and the electrolyte solution, granulated particles with an appropriate particle diameter can be obtained.

The stirring time can be appropriately set to a time sufficient to granulate the electrode active material and the conductive aid. The stirring time is not particularly limited, but is preferably 1 to 20 minutes, more preferably 1 to 10 minutes, still more preferably 3 to 8 minutes, and particularly preferably 5 to 7 minutes. Stirring may be performed once continuously for the stirring time, or may be performed several times in a divided manner for the stirring time as a total. Further, the stirring temperature is also not particularly limited, but can be set to, for example, 10 to 25° C.

(Second Granulation Step)

In the second granulation step, the electrode active material, the conductive aid, and the liquid component (preferably, the electrolyte solution) are charged into the container of the stirring device and stirred, so that the second granulated particles are manufactured. In the second granulation step, a wet mixing process is performed because the liquid component is used.

In the second granulation step, the liquid component may be added to the first granulated particles granulated by the first granulation step and then the mixing process may be performed, or the mixing process may be performed on the electrode active material, the conductive aid, and the liquid component before the mixing process.

The processing conditions of the mixing process are determined so that the electrode active material, the conductive aid, and the liquid component are uniformly mixed and have a particle diameter and fluidity that allow easy forming into an electrode. The stirring speed (the peripheral speed) is not particularly limited, but is preferably 1 to 100 m/s, more preferably 5 to 50 m/s, still more preferably 10 to 30 m/s, and particularly preferably 10 to 20 m/s. Further, as the peripheral speed increases, the particle diameter of the granulated particles finally obtained tends to decrease. If the peripheral speed falls within the ranges described above, by combining with conditions such as the content of the pressure-sensitive adhesive and the electrolyte solution, granulated particles with an appropriate particle diameter can be obtained.

The stirring time can be appropriately set to a time sufficient to granulate the electrode active material, the conductive aid, and the liquid component. The stirring time is not particularly limited, but is preferably 1 to 20 minutes, more preferably 1 to 10 minutes, still more preferably 3 to 8 minutes, and particularly preferably 5 to 7 minutes. Stirring may be performed once continuously for the stirring time, or may be performed several times in a divided manner for the stirring time as a total. Further, the stirring temperature is also not particularly limited, but can be set to, for example, 10 to 25° C.

(Third Granulation Step)

In the third granulation step, the electrode active material, the conductive aid, the liquid component (preferably, the electrolyte solution), and the pressure-sensitive adhesive are charged into the container of the stirring device and stirred, so that the third granulated particles are produced. In the third granulation step, the wet mixing process is performed because the liquid component is used. In the third granulation step, the mixing process may be performed on a pressure-sensitive adhesive diluted with the liquid component as a solvent, and then the liquid component may be dried after the mixing process.

In the third granulation step, the pressure-sensitive adhesive may be added to the second granulated particles granulated by the second granulation step and then the mixing process may be performed, or the mixing process may be performed by adding the liquid component and the adhesive to the first granulated particles granulated by the first granulation step. Alternatively, the electrode active material, the conductive aid, the liquid component, and the pressure-sensitive adhesive before the mixing process may be mixed at the same time.

The processing conditions of the mixing process are determined so that the electrode active material, the conductive aid, and the liquid component are uniformly mixed and have a particle diameter and fluidity that allow easy forming into an electrode. The stirring speed (the peripheral speed) is not particularly limited, but is preferably 1 to 100 m/s, more preferably 5 to 50 m/s, still more preferably 10 to 30 m/s, and particularly preferably 10 to 20 m/s. Further, as the peripheral speed increases, the particle diameter of the granulated particles tends to decrease. If the peripheral speed falls within the ranges described above, by combining with conditions such as the content of the pressure-sensitive adhesive and the electrolyte solution, granulated particles with an appropriate particle diameter can be obtained.

In the mixing process, stirring may be performed once continuously, or may be performed intermittently with a pause time for temporarily stopping stirring. The stirring time can be appropriately set to a time sufficient to granulate the electrode active material, the conductive aid, and the liquid component. The stirring time is not particularly limited, but is preferably 3 to 60 minutes, more preferably 5 to 30 minutes, still more preferably 10 to 15 minutes, and particularly preferably 15 minutes. Stirring may be performed once continuously for the stirring time, or may be performed several times in a divided manner for the stirring time as a total.

Further, the stirring temperature is also not particularly limited, but can be set to, for example, 10 to 25° C. When the liquid component is dried after the mixing process, the drying temperature can be set to, for example, 40 to 70° C., and the drying time can be set to, for example, 90 to 140 minutes.

Although it has been described that the granulated particles are manufactured in the granulation step described above, the one manufactured in the granulation step described above is an aggregation (a powder) including at least one of a single granulated particle and an aggregate in which a plurality of granulated particles are aggregated.

[Supply Step]

The supply step includes a powder supply step, a vibration step, a sorting step, a moving step, and a deposition step. In the powder supply step, the powder composed of the granulated particles obtained in the granulation step described above is supplied. In the vibration step, vibration is applied to the powder. In the sorting step, by passing the powder through at least one opening, the particle diameter of the granulated particles is adjusted to a particle diameter that allows passing through the opening. In the moving step, the powder that has passed through the opening is moved from the outlet position of the opening to the supply position where the powder is supplied to the surface of a current collector. In the deposition step, the powder is deposited on the surface of the current collector that moves relative to the supply position.

In the following description, the path for moving the powder from the outlet position of the opening to the supply position where the powder is supplied to the surface of the current collector is referred to as "runway". The powders are dispersed and arranged side by side while moving along the runway. As a result, when the powders are moved to the supply position, the powders are aligned. The runway is preferably formed of a flat surface, but the surface may have minute irregularities that allow the powder to jump across and move.

Figure 2:
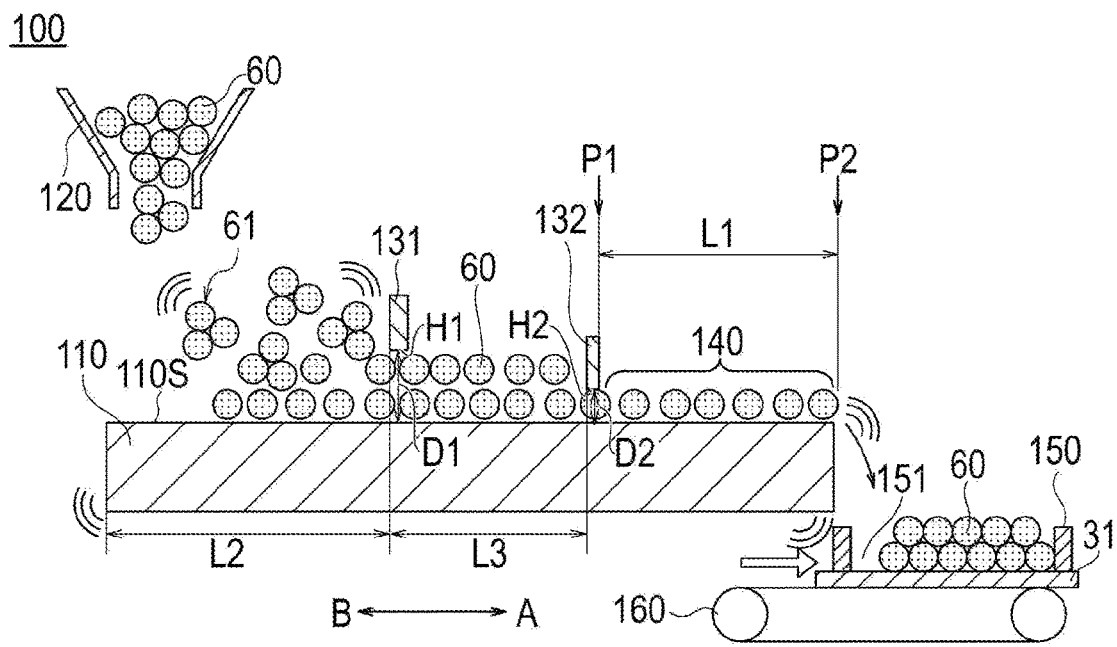
FIG. 2 is a schematic cross-sectional view illustrating a supply device that performs a supply step according to an embodiment of the present invention.

FIG. 2 is a schematic cross-sectional view illustrating a supply device 100 that performs a supply step according to an embodiment of the present invention. In the supply step of the present embodiment, the vibration step and the moving step are performed at the same time, and the sorting step is performed in the middle of the steps.

As illustrated in FIG. 2, the supply device 100 of the present embodiment includes a single substrate 110, a hopper 120 that supplies a powder 60 composed of granulated particles to one end portion of the substrate 110, and baffle plates 131 and 132 that form openings H1 and H2 between an upper surface 110S of the substrate 110 and the baffle plates 131 and 132. The supply device 100 further includes a frame 150 arranged on the outer edge of the surface of the current collector 31, and a transport unit 160 that transports the current collector 31 and the frame 150.

The substrate 110 is composed of a plate-like member arranged in a horizontal direction. The substrate 110 is vibrated by a vibration generator (not illustrated) to vibrate along the moving direction of the powder 60. A conventionally known vibration generator such as an electromagnetic vibration generator that uses an electromagnet as a drive source or a piezoelectric vibration generator that uses a piezoelectric element can be appropriately used.

In the powder supply step, the hopper 120 is used to supply a fixed amount of the powder 60 to one end portion of the upper surface 110S of the substrate 110.

In the vibration step and the moving step, the powder 60 is placed on the upper surface 110S of the vibrating substrate 110 and vibrated to be moved from one end portion of the upper surface 110S of the substrate 110 to a supply position P2 at the other end portion.

The powder 60 in contact with the upper surface 110S of the vibrating substrate 110 vibrates due to the friction force (the static friction force and the kinetic friction force) with the upper surface 110S of the substrate 110. Further, the powder 60 that is not in contact with the upper surface 110S of the substrate 110 vibrates due to the friction force or the collision force with the powder 60 that is in contact with the upper surface 110S of the substrate 110. By applying vibration to the powder 60 through the vibrating substrate 110 as described above, the powder 60 can be moved from the one end portion to the other end portion of the upper surface 110S of the substrate 110 while an aggregate 61 is crushed.

Here, the moving direction of the powder 60 is indicated by an arrow A in the figure. Further, the direction backward to the moving direction A of the powder 60 is referred to as "backward direction" and is indicated by an arrow B in the figure.

An acceleration $a_1$ in the moving direction A and an acceleration $a_2$ in the backward direction B in the vibration of the substrate 110 are set so that the following Relational Expression (1) holds. As a result, the powder 60 can be moved in the moving direction A by utilizing the vibration of the substrate 110. The mechanism to move the powder 60 by utilizing the vibration of the substrate 110, which satisfies Relational Expression (1), will be described later.

[Expression 1]

$$a_1 < \mu_s g < a_2 \qquad \text{Expression (1)}$$

Here, $\mu_s$ is the static friction coefficient of the upper surface 110S of the substrate 110, and g is a gravitational acceleration.

The vibration frequency of the substrate 110 is not particularly limited as long as the accelerations $a_1$ and $a_2$ in the vibration direction (the moving direction A, the backward direction B) satisfy the above relational expression (1), but is preferably 50 to 1000 Hz, more preferably 100 to 800 Hz, still more preferably 100 to 600 Hz, particularly preferably 100 to 300 Hz, and most preferably 100 to 200 Hz. If the vibration frequency of the substrate 110 is too small, the acceleration $a_2$ is smaller than $\mu_s g$, and if the vibration frequency of the substrate 110 is too large, the acceleration $a_1$ is larger than $\mu_s g$, so that the above relational expression (1) cannot be satisfied. By setting the vibration frequency of the substrate 110 within the ranges described above, the accelerations $a_1$ and $a_2$ satisfy the above relational expression (1), and thus the powder 60 can be reliably moved in the moving direction A by utilizing the vibration of the substrate 110.

The baffle plates 131 and 132 are arranged with an interval from the upper surface 110S of the substrate 110 to form the openings H1 and H2 formed by slits (gaps). The baffle plates 131 and 132 are arranged between the one end portion and the other end portion of the upper surface 110S of the substrate 110. In the sorting step, the powder 60 is caused to pass through the openings H1 and H2 while being vibrated and moved from the one end portion to the other end portion of the upper surfaces 110S of the substrate 110. In the present embodiment, two openings H1 and H2 are formed by the two baffle plates 131 and 132, but the number of openings is not limited to this, and one or three or more openings may be formed.

When a plurality of openings are formed, it is preferable to gradually reduce the size of the openings H1 and H2 toward the moving direction A of the powder 60, as in the present embodiment illustrated in FIG. 2. If only the powder 60 with a small particle diameter is to be sorted at a time by a small opening, the opening is clogged with the powder 60 with a large particle diameter or the aggregate 61, and the movement of the powder 60 with a small particle diameter may be hindered. By gradually reducing the size of the opening toward the moving direction A of the powder 60, the powders 60 with a reduced particle diameter can be gradually sorted without hindering the movement of the powder 60.

Regarding the size of the opening (in the present embodiment, distances D1 and D2 between the baffle plates 131 and 132 and the upper surface 110S of the substrate 110), it is preferable to appropriately select an optimum size according to the number of openings and the particle diameter of granulated particles. In the case of the present embodiment illustrated in FIG. 2, the size D1 of the opening H1 is preferably 5 to 5000 µm, more preferably 100 to 2500 µm, still more preferably 100 to 700 µm, and particularly preferably 200 to 600 µm. The size D2 of the opening H2 is preferably 1 to 1000 µm, more preferably 50 to 500 µm, still more preferably 50 to 300 µm, and particularly preferably 100 to 300 µm.

A runway 140 is a path that is composed of the upper surface 110S of the substrate 110, and is used to move the powder 60 from the outlet position P1 of the powder 60 immediately after passing through the opening H2 to the supply position P2 that is the other end portion of the substrate 110. If a length (a running distance) L1 of the runway 140 is too long, the time of the supply step increases, and if the length L1 of the runway 140 is too short, the powders 60 cannot be aligned at the supply position P2. From the above viewpoint, the length L1 of the runway 140 is preferably 5 to 100 mm, more preferably 10 to 50 mm, still more preferably 15 to 30 mm, and particularly preferably 20 to 25 mm. The length L1 of the runway 140 is preferably determined in view of various conditions such as the moving speed of the powder 60 and the moving speed of the current collector 31.

In the deposition step, the powder 60 drops from the supply position P2, which is the other end portion of the substrate 110, to be deposited on the surface of the current collector 31 that moves in the moving direction A relative to the supply position P2 of the substrate 110. In this case, the powder 60 is deposited in a space 151 surrounded by the frame 150 arranged on the surface of the current collector 31. The space 151 surrounded by the frame 150 is formed to have substantially the same size and shape as the size and shape of the electrode active material layer 32. As a result, the powder 60 can be reliably arranged at the position on the surface of the current collector 31 where the electrode active material layer 32 is to be formed.

(Mechanism of Moving Powder Composed of Granulated Particles by Utilizing Vibration of Substrate)

Figure 3A:
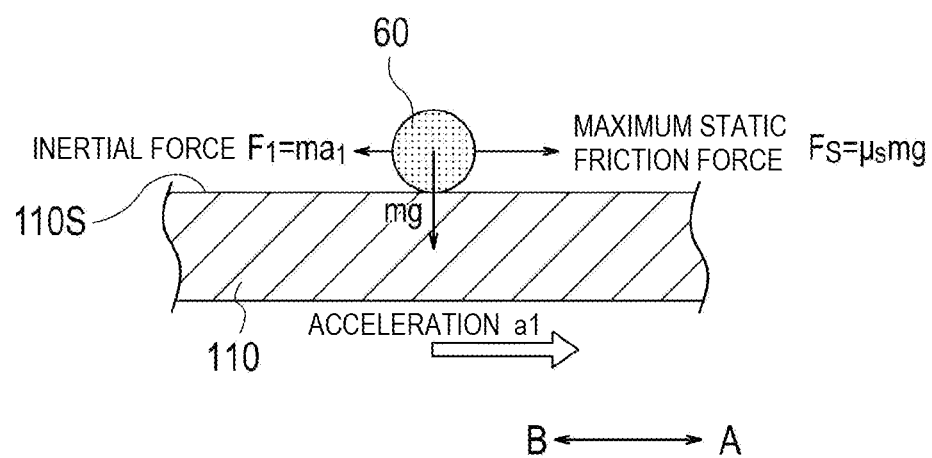
FIG. 3A is a diagram for explaining a mechanism of moving a powder composed of granulated particles by utilizing vibration of a substrate.

Next, the mechanism of moving the powder 60 in the moving direction A by utilizing the vibration of the substrate 110 will be described with reference to FIGS. 3A and 3B. It is assumed that the vibration direction of the substrate 110 is a direction of reciprocating in the moving direction A and the backward direction B, and the acceleration $a_1$ in the moving direction A and the acceleration $a_2$ in the backward direction B satisfy Relational Expression (1) described above. FIG. 3A illustrates a state where the substrate 110 moves in the moving direction A, whereas FIG. 3B illustrates a state where the substrate 110 moves in the backward direction B.

As illustrated in FIG. 3A, when the substrate 110 moves in the moving direction A during vibration, an inertial force $F_1$ in the backward direction B acting on the powder 60 on the substrate 110 can be expressed as $F_1=ma_1$ by using a mass m of the powder 60 and the acceleration $a_1$ in the moving direction A of the substrate 110. Here, when $a_1<\mu_s g$ in Relational Expression (1) described above holds, the inertial force $F_1$ in the backward direction B ($=ma_1$)<a maximum static friction force $F_s$ ($=\mu_s mg$). Consequently, the powder 60 is stationary with respect to the substrate 110.

Figure 3B:
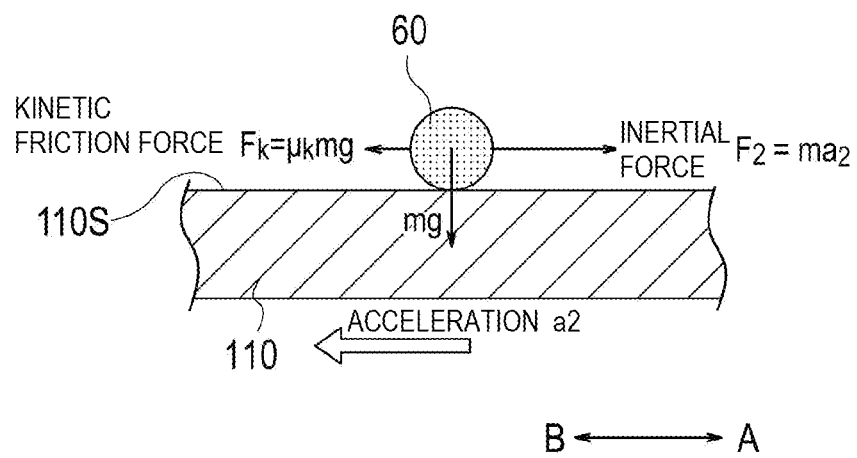
FIG. 3B is a diagram for explaining the mechanism of moving the powder composed of granulated particles by utilizing the vibration of the substrate.

On the other hand, as illustrated in FIG. 3B, when the substrate 110 moves in the backward direction B during vibration, an inertial force $F_2$ in the moving direction A acting on the powder 60 on the substrate 110 can be expressed as $F_2=ma_2$ by using the mass m of the powder 60 and the acceleration $a_2$ in the backward direction B of the substrate 110. Here, when $\mu_s g<a_2$ in Relational Expression (1) described above holds, the maximum static friction force $F_2$ ($=\mu_s mg$)<the inertial force $F_2$ in the moving direction A ($=ma_2$). Consequently, the powder 60 moves in the moving direction A relative to the substrate 110. A kinetic friction force $F_k$ ($=\mu_k mg$, $\mu_k$: a kinetic friction coefficient of the upper surface 110S of the substrate 110) acts on the powder 60 in the backward direction B, but the kinetic friction force $F_k$ is smaller than the maximum static friction force $F_s$ (<the inertial force $F_2$ in the moving direction A), and thus the powder 60 moves in the moving direction A relative to the substrate 110.

As described above, in the vibration of the substrate 110 that satisfies Relational Expression (1) described above, when the substrate 110 moves in the moving direction A during vibration, the inertial force $F_1$ in the backward direction B is smaller than the maximum static friction force $F_s$, and thus the powder 60 is stationary with respect to the substrate 110. On the other hand, when the substrate 110 moves in the backward direction B, the inertial force $F_2$ in the moving direction A is larger than the maximum static friction force $F_s$, and thus the powder 60 moves in the moving direction A relative to the substrate 110. Based on the mechanism described above, the powder 60 can be moved in the moving direction A by utilizing the vibration of the substrate 110 set to satisfy Relational Expression (1) described above.

Next, the operations and effects of the supply step in the method of manufacturing an electrode according to the present embodiment will be described.

The supply step of the method of manufacturing an electrode according to the present embodiment includes a vibration step, a sorting step, a moving step, and a deposition step. In the vibration step, vibration is applied to the powder 60. In the sorting step, by passing the powder 60 through at least one opening H1, H2, the particle diameter of granulated particles is adjusted to a particle diameter that allows passing through the opening H1, H2. In the moving step, the powder 60 that has passed through the openings H1 and H2 is moved from the outlet position P1 of the openings H1 and H2 to the supply position P2 where the powder is supplied to the surface of the current collector 31. In the deposition step, the powder 60 is deposited on the surface of the current collector 31 that moves relative to the supply position P2.

According to the method of manufacturing an electrode described above, by applying vibration to the aggregate 61 in the vibration step, the aggregate 61 can be crushed and separated into a single granulated particle. Further, in the sorting step, the granulated particles and aggregates 61 with a particle diameter larger than that of the openings H1 and H2 can be eliminated, and granulated particles with a more uniform particle diameter can be sorted. Furthermore, in the moving step, a plurality of the powders 60 that have passed through the openings H1 and H2 are moved along the runway 140 to be aligned at the supply position P2. Consequently, a fixed amount of the plurality of powders 60 aligned at the supply position P2 can be supplied to the surface of the current collector 31 that moves relative to the supply position P2. As a result, the thickness and density of the powder 60 supplied to the surface of the current collector 31 can be made uniform, so that the battery performance can be improved.

Moreover, in the vibration step, the powder 60 is placed on the upper surface 110S of the vibrating substrate 110 to vibrate the powder 60. As a result, it is possible to vibrate and reliably crush the aggregate 61 in which the plurality of powders 60 are aggregated with a simple configuration of vibrating the substrate 110.

Further, by moving the powder 60 using the vibration of the substrate 110, the vibration step and the moving step are performed at the same time. As a result, the powder 60 can be moved while the aggregate 61 is crushed, and thus the manufacturing time can be significantly reduced.

Furthermore, when the powder 60 is moved by utilizing the vibration of the substrate 110, it is preferable to set the vibration frequency of the substrate 110 in a range of 100 to 200 Hz. As a result, the powder 60 can be reliably moved by utilizing the vibration of the substrate 110.

Further, the openings H1 and H2 are formed by gaps that are formed between the upper surface 110S of the substrate 110 and the baffle plates 131 and 132. As a result, it is possible to perform the sorting step of sorting a particle diameter by causing the powder 60 to pass through the opening while moving the upper surface 110S of the substrate 110. As described above, by performing the vibration step and the moving step at the same time and performing the sorting step in the middle of these steps, the manufacturing time can be significantly reduced, and the electrode in which the thickness and density of the powder 60 are uniform can be efficiently manufactured.

Further, when the powder 60 includes a wet powder containing an electrolyte solution, the powder 60 can be easily formed into a spherical shape. As the particle diameter of granulated particles can be easily adjusted, the electrode in which the thickness and density of the powder 60 are uniform can be relatively easily manufactured.

Moreover, when the powder 60 is a wet powder containing an electrolyte solution as described above, the content of the electrolyte solution contained in the powder 60 is preferably 0.01 to 10% by mass with respect to the total mass of the powder 60. If the electrolyte solution is contained within the above range, the particle diameter of granulated particles can be easily adjusted, and the adhesiveness of the surface of the powder 60 can be reduced to a low level, so that the powders 60 can be easily separated from each other. As a result, it is possible to relatively easily manufacture the electrode in which the thickness and density of the powder 60 are uniform.

Further, in the deposition step, the frame 150 is arranged on the surface of the current collector 31, and the powder 60 is deposited in the space 151 surrounded by the frame 150. As a result, the powder 60 can be reliably arranged at the position on the surface of the current collector 31 where the electrode active material layer 32 is to be formed.

Hereinafter, modifications of the supply step will be described. The configuration of the supply step according to the present invention can be appropriately changed as long as the supply step has a vibration step, a sorting step, a moving step, and a deposition step. The following modifications describe examples of a plurality of embodiments included in the present invention, but the present invention is not limited to the embodiment described above and the modifications. The same reference numerals are given to configurations similar to those in the embodiment described above, and description thereof will be omitted.

(First Modification)

Figure 4:
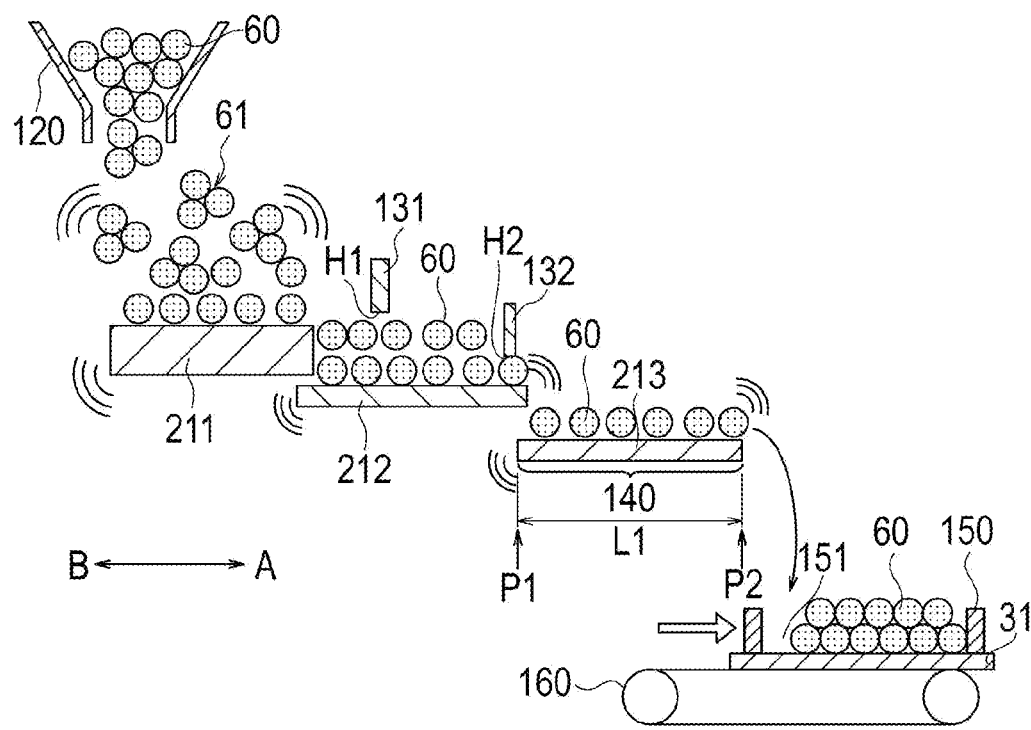
FIG. 4 is a schematic cross-sectional view for explaining a supply step according to a first modification.

FIG. 4 is a diagram illustrating a supply step according to a first modification. The present embodiment is different from the embodiment described above in that the vibration step, the sorting step, and the moving step in the supply step are performed using a plurality of different substrates.

The supply device for performing the supply step according to the present embodiment has a first substrate 211 for performing the vibration step, a second substrate 212 for performing the sorting step, and a third substrate 213 for performing the moving step and the deposition step. The first substrate 211, the second substrate 212, and the third substrate 213 are arranged so that the height decreases in this order.

In the vibration step, the first substrate 211 is vibrated to crush the aggregate 61, and at the same time, the powder 60 crushed is moved to the second substrate 212.

In the sorting step, the second substrate 212 is vibrated to move the powder 60 to the side of the third substrate 213, and the powder 60 passes through the openings H1 and H2 formed between the second substrate 212 and the baffle plates 131 and 132 to drop to the outlet position P1 of the third substrate 213.

In the moving step, the second substrate 212 is vibrated to move the powder 60 from the outlet position P1 to the supply position P2 of the third substrate 213. The upper surface of the third substrate 213 constitutes the runway 140.

In the deposition step, the powder 60 drops from the supply position P2 of the third substrate 213 to be deposited on the surface of the current collector 31 that moves in the moving direction A relative to the supply position P2 of the third substrate 213.

The effects similar to those of the embodiment described above can be obtained even if a plurality of substrates are used as in the present embodiment. The embodiment in which a plurality of substrates are used is not limited to the embodiment in which different substrates are used in the respective steps as in the present embodiment, and for example, one substrate may be shared in the vibration step and the sorting step, or one substrate may be shared in the sorting step and the moving step.

(Second Modification)

Figure 5:
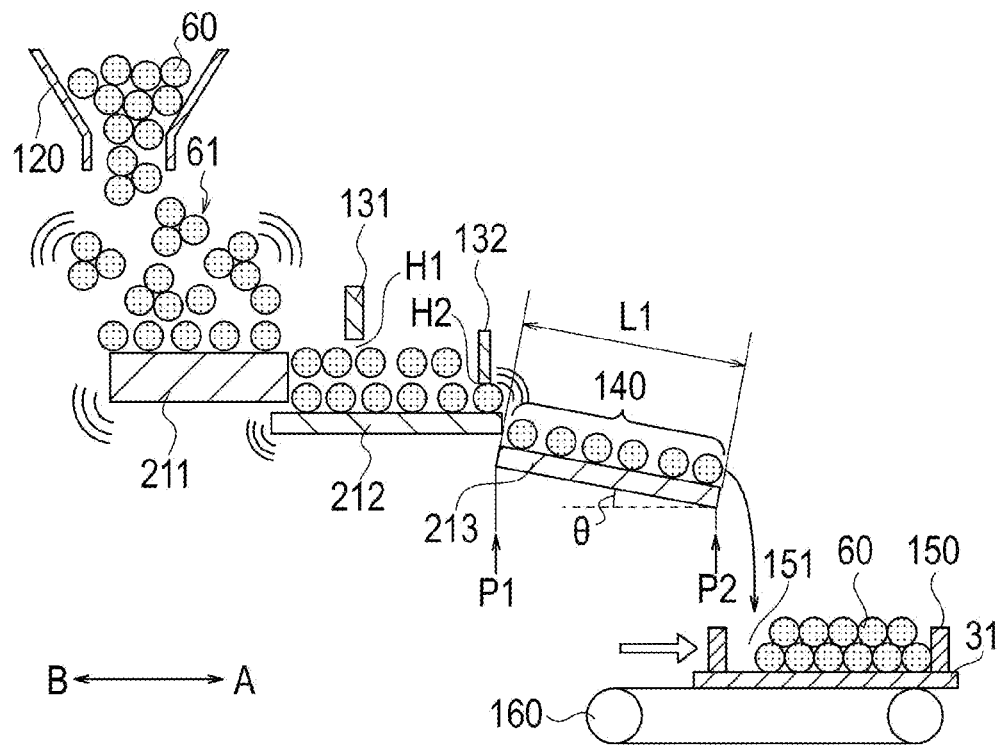
FIG. 5 is a schematic cross-sectional view for explaining a supply step according to a second modification.

FIG. 5 is a diagram illustrating a supply step according to a second modification. The present embodiment is different from the first modification described above in that the powder 60 is moved by tilting the third substrate 213 in the moving step. An angle θ at which the third substrate 213 is tilted can be appropriately selected according to the static friction coefficient of the upper surface of the third substrate 213 and the required moving speed of the powder 60. The manufacturing cost can be reduced with a simple configuration of tilting the third substrate 213, as compared with the case where the substrate is vibrated. Moreover, effects similar to those of the embodiment described above can be obtained.

(Third Modification)

Figure 6:
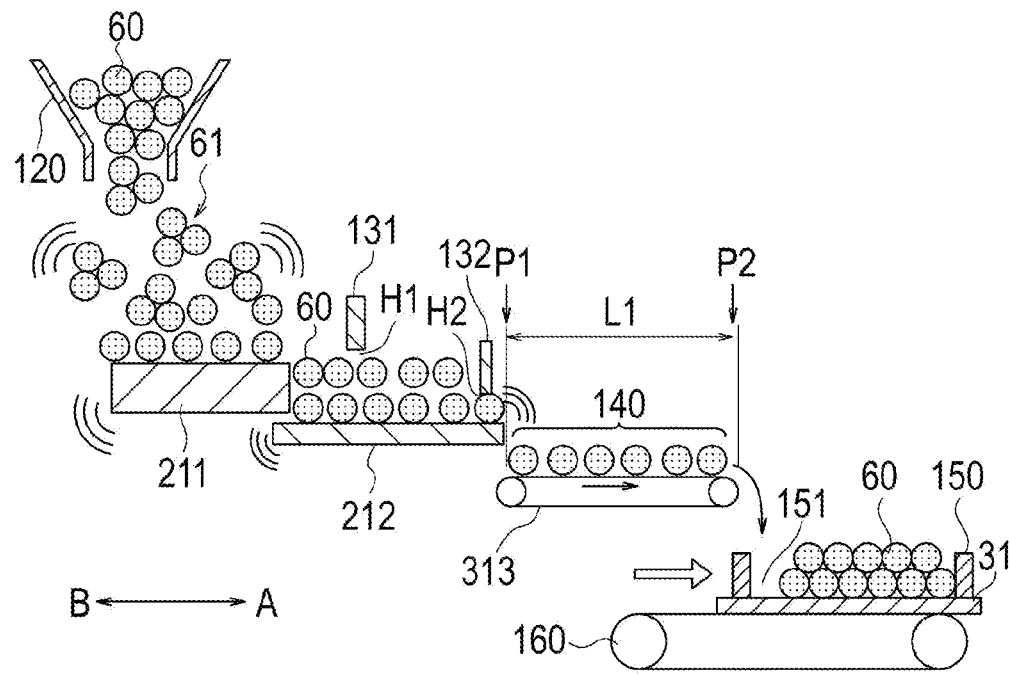
FIG. 6 is a schematic cross-sectional view for explaining a supply step according to a third modification.

FIG. 6 is a diagram illustrating a supply step according to a third modification. The present embodiment is different from the first modification described above in that the powder 60 is moved by using a belt conveyor 313 in the moving step. The amount of the powder 60 conveyed by the belt conveyor 313 per unit time is preferably set to be smaller than the amount of the powder 60 supplied from the second substrate 212 to the belt conveyor 313 per unit time. As a result, a plurality of the powders 60 can be spread on the belt conveyor 313 without gaps and a predetermined amount of the powders 60 can be aligned at the supply position P2, so that effects similar to those of the embodiment described above can be obtained.

(Fourth Modification)

Figure 7:
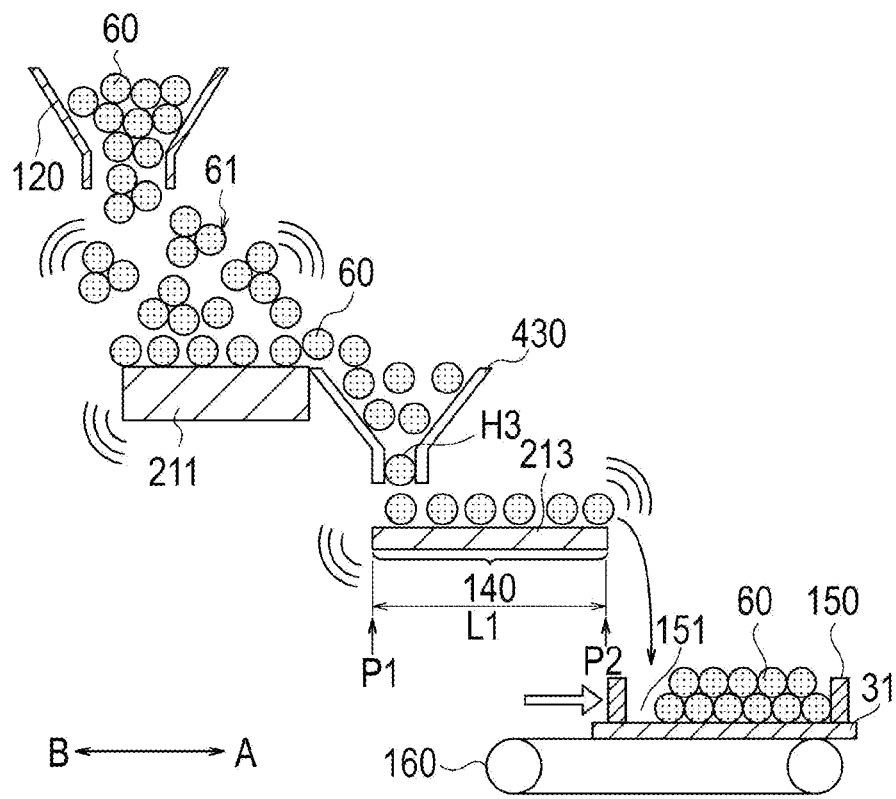
FIG. 7 is a schematic cross-sectional view for explaining a supply step according to a fourth modification.

FIG. 7 is a diagram illustrating a supply step according to a fourth modification. The present embodiment is different from the first modification described above in that a funnel 430 with an opening H3 is used in the sorting step. As granulated particles pass through the opening H3 of the funnel 430, the particle diameter of the granulated particles can be sorted. The number of funnels to be passed is not limited to one, and a plurality of funnels may be provided.

(Fifth Modification)

Figure 8:
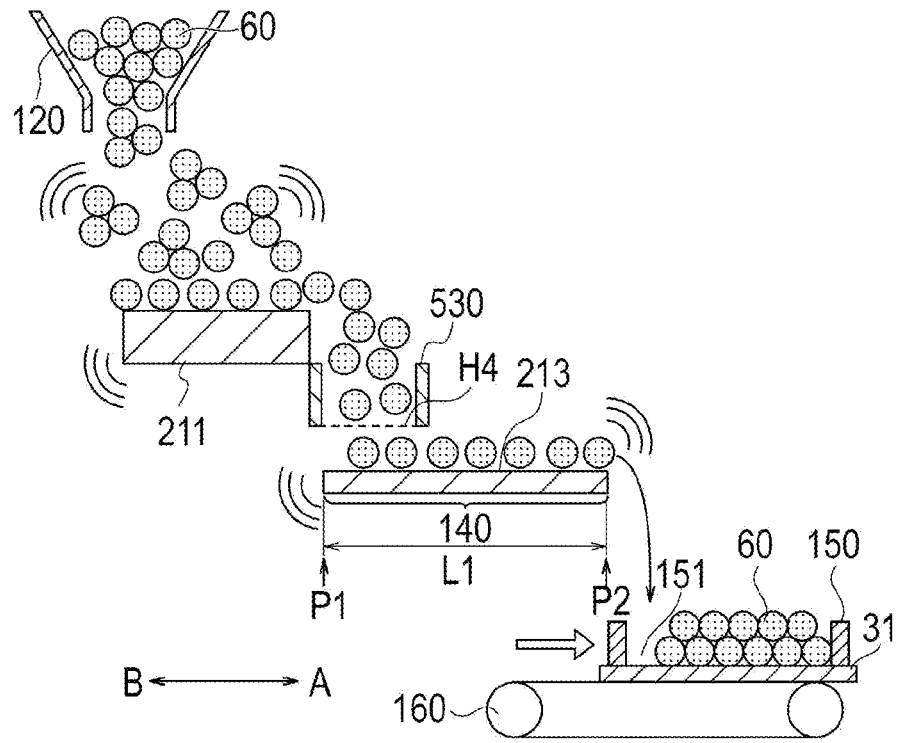
FIG. 8 is a schematic cross-sectional view for explaining a supply step according to a fifth modification.

FIG. 8 is a diagram illustrating a supply step according to a fifth modification. The present embodiment is different from the first modification described above in that a sieve 530 with a mesh H4 is used in the sorting step. As granulated particles pass through the mesh H4 of the sieve 530, the particle diameter of the granulated particles can be sorted.

Since the fourth and fifth modifications also have the moving step after the sorting step, it is possible to align a plurality of the powders 60 at the supply position P2 and supply a fixed amount of the powder 60 to the surface of the current collector 31. Consequently, effects similar to those of the embodiment described above can be obtained.

(Other Modifications)

The configuration of the vibration step is not limited to a configuration in which the substrate is vibrated to apply vibration to the powder, and the powder may be vibrated by an air flow, a sound wave, or the like.

[Pressing Step]

In the pressing step, the powder 60 supplied to the surface of the current collector 31 is pressed in a thickness direction to prepare an electrode. By pressing the powder 60 deposited on the surface of the current collector 31, the powder 60 can be densified and the thickness can be made more uniform. The pressing method in the pressing step is not particularly limited, and for example, a roll press forming method, a surface press forming method of pressing with a pressing surface, or the like can be appropriately used. From the viewpoint of productivity, the roll press forming method can be preferably used.

Figure 9:
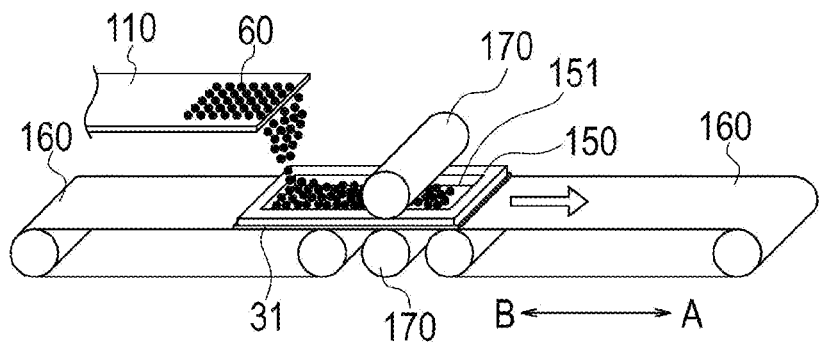
FIG. 9 is a schematic cross-sectional view for explaining a pressing step according to an embodiment of the present invention.
Figure 10:
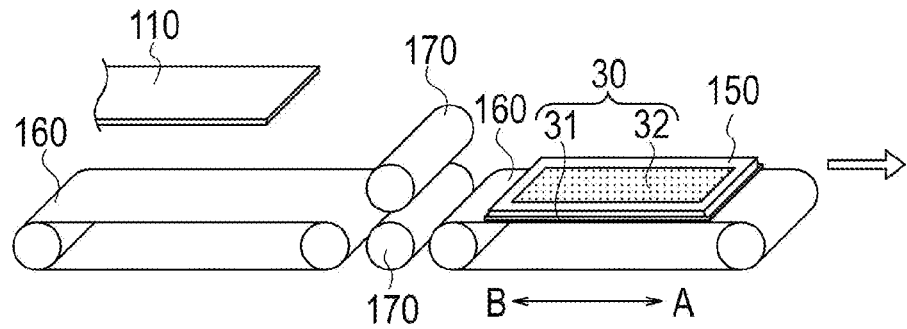
FIG. 10 is a schematic cross-sectional view illustrating a state where an electrode is formed after the pressing step illustrated in FIG. 9.

In the roll press forming method, for example, a roll press device including a pair of pressure rollers 170 illustrated in FIG. 9 is used. While the current collector 31 transported by the transport unit 160 is transported with a pair of pressure rollers 170, the current collector 31 and the powder 60 are vertically sandwiched and pressed. As a result, the current collector 31 and the powder 60 can be pressed without stopping the transport (the movement) of the current collector 31, so that the productivity can be improved. The pressure per unit area applied to the powder 60 during pressing is not particularly limited, but is preferably 0.01 to 40 MPa, more preferably 1 to 30 MPa, and still more preferably 10 to 20 MPa. If the pressure falls within the ranges described above, the porosity and density of the electrode active material layer according to the preferred embodiment described above can be easily achieved. As illustrated in FIG. 10, after the pressing step, the electrode 30 in which the electrode active material layer 32 is formed on the surface of the current collector 31 is prepared.

<Components Other than Electrode>

The current collector and the electrode active material layer among the components of the bipolar secondary battery according to the preferred embodiment of the present invention have been described in detail above, but conventionally known knowledge is appropriately referred to for the other components.

[Electrolyte Layer]

An electrolyte layer 40 is a layer in which the electrolyte is held by a separator, and is present between the positive electrode active material layer 32a and the negative electrode active material layer 32b to prevent the positive electrode active material layer 32a and the negative electrode active material layer 32b from coming into direct contact with each other. The electrolyte used for the electrolyte layer 40 of the present embodiment is not particularly limited, and examples thereof include an electrolyte solution, a gel polymer electrolyte, and the like. By using these electrolytes, high lithium ion conductivity can be ensured.

The electrolyte solution that is similar to the electrolyte solution that can be contained in the powder composed of granulated particles described above may be used.

The separator has a function of holding an electrolyte and ensuring lithium ion conductivity between the positive electrode 30a and the negative electrode 30b, and a function as a partition wall between the positive electrode 30a and the negative electrode 30b.

Examples of the form of the separator include a porous sheet separator made of a polymer or fiber that absorbs and holds the electrolyte, a non-woven fabric separator, and the like.

[Positive Electrode Current Collecting Plate and Negative Electrode Current Collecting Plate]

The material constituting the current collecting plates 34a and 34b is not particularly limited, and known highly conductive materials conventionally used as current collecting plates for lithium ion secondary batteries can be used. As the constituent material of the current collecting plates 34a and 34b, for example, metal materials such as aluminum, copper, titanium, nickel, stainless steel, and alloys thereof are preferable. From the viewpoints of light weight, corrosion resistance, and high conductivity, aluminum and copper are more preferable, and aluminum is particularly preferable. The same material may be used, or different materials may be used for the positive electrode current collecting plate 34a and the negative electrode current collecting plate 34b.

[Seal Part]

A seal part 50 has a function of preventing contact between the current collectors 31 and a short circuit at the end portion of the unit cell 20. The material constituting the seal part 50 may be any material as long as the material has insulating properties, sealing properties (liquid tightness), heat resistance under battery operating temperature, and the like. For example, an acrylic resin, a urethane resin, an epoxy resin, a polyethylene resin, a polypropylene resin, a polyimide resin, rubber (ethylene-propylene-diene rubber: EPDM), and the like can be used. Alternatively, an isocyanate adhesive, an acrylic resin adhesive, a cyanoacrylate adhesive, or the like may be used, and a hot-melt adhesive (a urethane resin, a polyamide resin, and a polyolefin resin) or the like may also be used. Among these materials, from the viewpoints of corrosion resistance, chemical resistance, ease of production (film-forming performance), economical efficiency, and the like, a polyethylene resin or a polypropylene resin is preferably used as the constituent material of an insulating layer, and a resin that contains an amorphous polypropylene resin as a main component and is obtained by copolymerizing ethylene, propylene, and butene is preferably used.

[Outer Casing Body]

In the present embodiment illustrated in FIG. 1, the outer casing body 12 is formed of a laminated film in a bag shape, but the present invention is not limited to this, and for example, a known metal can case, or the like may be used. The outer casing body 12 is preferably formed of a laminated film from the viewpoints of having high output and excellent cooling performance, and being appropriately used for batteries for large devices such as EVs and HEVs. For example, a laminated film with a three-layer structure in which polypropylene (PP), aluminum, and nylon are stacked in this order can be used as the laminated film, but is not limited thereto. In addition, since the group pressure applied from outside to the stack 11 can be easily controlled and the thickness of the electrolyte layer 40 can be easily controlled to a desired value, the outer casing body 12 is more preferably a laminated film containing aluminum.

EXAMPLE

Hereinafter, the present invention will be described in more detail with reference to an example. However, the technical scope of the present invention is not limited to the following example. "Part" means "part by mass" unless otherwise specified.

[Preparation of Positive Electrode Granulated Particles]

98.0 parts of a lithium-nickel-cobalt-aluminum composite oxide (an NCA composite oxide) as a positive electrode active material (manufactured by BASF TODA Battery Materials LLC.), 1.0 parts of acetylene black (AB) as a conductive aid (DENKA BLACK (registered trademark) manufactured by Denka Company Limited, average particle diameter (primary particle size): 0.036 μm), and 1.0 parts of carbon nanofiber (CNF) as a conductive aid (VGCF (registered trademark) manufactured by Showa Denko K.K., an aspect ratio of 60, average fiber diameter: about 150 nm, average fiber length: about 9 μm, an electrical resistivity of 40 μΩm, and a bulk density of 0.04 g/cm$^3$) were charged into a stirring tank of a stirring device (EIRICH Intensive Mixer manufactured by Nippon Eirich Co., Ltd., see JP 2013-017923 A), and were stirred at room temperature and a stirring rate of 20 m/s for 7 minutes. As a result of this stirring, positive electrode granulated particles were prepared.

[Volume Average Particle Diameter (D50) of Granulated Particles]

3 of the powder of the positive electrode granulated particles was set in a robot shifter (manufactured by Seishin Enterprise Co., Ltd.), and sonic vibration was applied to the sieve to classify the powder. The weight of the sieve was measured before and after the classification, and the particle size distribution of the powder charged was calculated. The volume average particle diameter (D50) calculated from this particle size distribution was 44.6 μm.

[Preparation of Resin Current Collector]

75% by mass of polypropylene [trade name "SunAllomer (registered trademark) PL500A", manufactured by SunAllomer Ltd.] (B-1), 20% by mass of acetylene black (AB) (DENKA BLACK (registered trademark)), and 5% by mass of a modified polyolefin resin as a resin current collector dispersant (A) (Umex (registered trademark) 1001 manufactured by Sanyo Chemical Industries, Ltd.) were melt-kneaded in a twin-screw extruder under the conditions of 180° C., 100 rpm, and a residence time of 10 minutes, so that a resin current collector material was obtained. The resin current collector material obtained was extruded to obtain a resin current collector (20% AB-PP).

[Supply of Positive Electrode Granulated Particles to Surface of Current Collector]

The powder composed of the positive electrode granulated particles described above was supplied to the surface of the resin current collector described above by using a parts feeder (PEF-L30AG, manufactured by Sanki Co., Ltd.) (a supply step). In this case, the target weight per unit area of the positive electrode granulated particles arranged on the surface of the resin current collector was set to 80 mg/cm$^2$, and conditions such as the vibration frequency and output of the parts feeder and the transport speed of the resin current collector were set.

Specifically, the powder composed of positive electrode granulated particles was supplied from a hopper onto a vibrating iron plate (corresponding to the substrate 110 in FIG. 2) with a length of 180 mm, a width of 70 mm, and a thickness of 5 mm. The vibration frequency of the iron plate was 160.7 Hz, and the output was 65.0%. The powder was moved from one end portion to the other end portion of the iron plate by the vibration of the iron plate. Two baffle plates were respectively placed at a position with a distance of 60 mm (corresponding to L2 in FIG. 2) from the one end portion of the iron plate in a powder moving direction, and at a position with a distance of 60 mm (corresponding to L3 in FIG. 2) from the position L2 with a distance of 60 mm, so that two openings were formed. The sizes of the opening were 5 mm and 0.3 mm, respectively, from the one closer to the one end portion of the iron plate. The length of a runway (a running distance corresponding to L1 in FIG. 2), which is the distance from the outlet position of the opening to a supply position at the other end portion of the iron plate, was set to 60 mm. A resin current collector (corresponding to the current collector 31) on which a frame with a space of 166 mm in length and 66 mm in width is arranged was transported under the supply position at the other end portion of the iron plate at a fixed speed of 15 mm/sec in the moving direction.

The weight and weight per unit area of the powder were measured at eight locations in the space surrounded by the frame on the surface of the resin current collector. Among the eight locations, the maximum value of the powder weight was 267.0 mg, the minimum value was 243.0 mg, and the average value was 254.5 mg. The coefficient of variation (CV %=100×standard deviation/average value) of the powder weight of the powder was 2.8%. It was confirmed from this result that the variation in the weight of the powder supplied to the surface of the resin current collector by the method of the example was small, and the powder was supplied to the surface of the resin current collector in a stable supply amount. The average value of the weight per unit area of the powder was 81.01 mg/cm$^2$. The error in the weight per unit area with respect to a target weight per unit area of 80 mg/cm$^2$ was 1.2%. It was confirmed from this result that the weight per unit area can be controlled accurately by the method of the example. Therefore, it was confirmed that when the powder composed of positive electrode granulated particles was used in electrode manufacturing, by performing a vibration step, a sorting step, and a moving step, the thickness and density of the powder supplied onto the resin current collector were made uniform, and the electrode with high quality was stably manufactured.

The present application is based on Japanese Patent Application No. 2019-020693 filed on Feb. 7, 2019, and the disclosures of which are incorporated herein by reference in their entirety.

REFERENCE SIGNS LIST

10 Battery
11 Stack

12 Outer casing body
20 Unit cell
30 Electrode
30a Positive electrode
30b Negative electrode
31 Current collector
31a Positive electrode current collector
31b Negative electrode current collector
32 Electrode active material layer
32a Positive electrode active material layer
32b Negative electrode active material layer
40 Electrolyte layer
50 Seal part
60 Powder composed of granulated particles
61 Aggregate
100 Supply device
110 Substrate
110S Upper surface
120 Hopper
131, 132 Baffle plate
H1, H2 Opening
140 Runway
150 Frame
151 Space
160 Transport unit
170 Pressure roller

The invention claimed is:

1. A method of manufacturing a battery electrode comprising:
a powder supply step of supplying a powder composed of granulated particles containing an electrode active material and a conductive aid;
a vibration step of breaking up particle aggregates in the powder by applying vibration to the powder;
a sorting step of passing the powder through at least one opening such that only particles having a predetermined particle diameter or less pass through the opening;
a moving step of moving the powder that has passed through the opening from an outlet position of the opening to a supply position; and
a deposition step of depositing the powder from the supply position onto a surface of a current collector in a layer having substantially uniform thickness.

2. The method of manufacturing a battery electrode according to claim 1, wherein in the vibration step, the powder is placed on an upper surface of a substrate that is vibrating to apply the vibration to the powder.

3. The method of manufacturing a battery electrode according to claim 2, wherein by moving the powder utilizing vibration of the substrate, the vibration step and the moving step are simultaneously performed.

4. The method of manufacturing a battery electrode according to claim 3, wherein a vibration frequency of the substrate is 100 to 200 Hz.

5. The method of manufacturing a battery electrode according to claim 2, wherein the opening is formed by a gap that is formed between the upper surface of the substrate and a baffle plate that is arranged at a distance from the upper surface of the substrate.

6. The method of manufacturing a battery electrode according to claim 5, wherein a second opening is formed by a gap that is formed between the upper surface of the substrate and a second baffle plate that is arranged at a second distance from the upper surface of the substrate, such that the sorting step includes passing the powder through the opening and through the second opening.

7. The method of manufacturing a battery electrode according to claim 2, wherein, in the sorting step, the powder is sorted using a second substrate positioned at an elevation that is lower than an elevation of the substrate.

8. The method of manufacturing a battery electrode according to claim 7, wherein the second substrate vibrates to apply vibration to the powder and to cause the powder to pass through the at least one opening.

9. The method of manufacturing a battery electrode according to claim 7, wherein the supply position is provided by a third substrate, the third substrate positioned at an elevation that is lower than the elevation of the second substrate.

10. The method of manufacturing a battery electrode according to claim 9, wherein an upper surface of the third substrate constitutes a runway for the granulated particles.

11. The method of manufacturing a battery electrode according to claim 9, wherein the third substrate vibrates.

12. The method of manufacturing a battery electrode according to claim 9, wherein the third substrate is tilted at an angle with respect to the second substrate.

13. The method of manufacturing a battery electrode according to claim 1, wherein the powder is a wet powder containing an electrolyte solution.

14. The method of manufacturing a battery electrode according to claim 13, wherein a content of an electrolyte solution contained in the powder is 0.01 to 10% by mass with respect to a total mass of the powder.

15. The method of manufacturing a battery electrode according to claim 1, wherein in the deposition step, a frame is arranged on an outer edge of a surface of the current collector, and the powder is deposited in a space surrounded by the frame.

16. The method of manufacturing a battery electrode according to claim 1, further comprising a pressing step of pressing and forming the powder deposited on a surface of the current collector.

17. The method of manufacturing a battery electrode according to claim 1, wherein in the deposition step, a volume average particle diameter D50 of the granulated particles of the powder deposited on a surface of the current collector is 100 to 300 μm.

* * * * *